(12) United States Patent
Rudnick et al.

(10) Patent No.: US 7,894,416 B2
(45) Date of Patent: *Feb. 22, 2011

(54) SYSTEM AND METHOD FOR COMMUNICATING IN A TIME DIVISION MULTIPLE ACCESS (TDMA) MESH NETWORK HAVING MINIMIZED END-TO-END LATENCY

(75) Inventors: William M. Rudnick, Pittsford, NY (US); David A. Clark, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 462 days.

This patent is subject to a terminal disclaimer.

(21) Appl. No.: 11/620,756

(22) Filed: Jan. 8, 2007

(65) Prior Publication Data

US 2008/0165745 A1    Jul. 10, 2008

(51) Int. Cl.
*H04B 7/212* (2006.01)

(52) U.S. Cl. .................. 370/347; 370/322; 370/330; 455/450

(58) Field of Classification Search ............ 370/406, 370/315–330, 336–338, 343–350, 431–463; 455/445, 428, 465, 446–455

See application file for complete search history.

(56) References Cited

U.S. PATENT DOCUMENTS

| 5,592,470 | A  | 1/1997 | Rudrapatna et al. | 370/320 |
|---|---|---|---|---|
| 6,097,707 | A  | 8/2000 | Hodzic et al. | 370/321 |
| 6,253,326 | B1 | 6/2001 | Lincke et al. | 713/201 |
| 6,343,318 | B1 | 1/2002 | Hawkins et al. | 709/219 |
| 6,370,160 | B1 | 4/2002 | Knutson et al. | 370/503 |
| 6,377,608 | B1 | 4/2002 | Zyren | 375/132 |
| 6,397,259 | B1 | 5/2002 | Lincke et al. | 709/236 |
| 6,574,266 | B1 * | 6/2003 | Haartsen | 375/133 |
| 6,590,588 | B2 | 7/2003 | Lincke et al. | 345/744 |
| 6,728,514 | B2 | 4/2004 | Bandeira et al. | 455/13.1 |
| 6,754,192 | B2 | 6/2004 | Kennedy | 370/331 |
| 6,763,013 | B2 | 7/2004 | Kennedy | 370/338 |
| 6,763,014 | B2 | 7/2004 | Kennedy | 370/338 |

(Continued)

FOREIGN PATENT DOCUMENTS

EP    1 650 901    4/2006

(Continued)

OTHER PUBLICATIONS

Cain et al., "*A Link Scheduling and Ad Hoc Networking Approach Using Directional Antennas*," 2003 IEEE Military Communications Conference, Oct. 13, 2003, vol. 2, pp. 643-648.

*Primary Examiner*—Ajit Patel
*Assistant Examiner*—Marcus Hammonds
(74) *Attorney, Agent, or Firm*—Allen, Dyer, Doppelt, Milbrath & Gilchrist, P.A.

(57) ABSTRACT

A system and method for communicating includes a plurality of wireless nodes forming a Time Division Multiple Access (TDMA) mesh network. Each wireless node includes a transmitter and receiver and is operative for transmitting data packets across the TDMA mesh network from a source node through intermediate nodes to a destination node using a TDMA epoch such that a slot of channel time is allocated in both time and TDMA epoch prior to a wireless node transmitting the data packet.

28 Claims, 3 Drawing Sheets

U.S. PATENT DOCUMENTS

| | | |
|---|---|---|
| 6,795,418 B2 | 9/2004 | Choi .......................... 370/336 |
| 6,798,761 B2 | 9/2004 | Cain et al. ................... 370/337 |
| 6,804,208 B2 | 10/2004 | Cain et al. ................... 370/326 |
| 6,845,091 B2 | 1/2005 | Ogier et al. .................. 370/338 |
| 6,847,619 B2 | 1/2005 | Zscheile, Jr. et al. ........ 370/322 |
| 6,847,627 B1 | 1/2005 | Knutson .......................... 370/347 |
| 6,850,532 B2 | 2/2005 | Thubert et al. .............. 370/401 |
| 6,901,064 B2 | 5/2005 | Cain et al. ................... 370/337 |
| 6,904,031 B1 | 6/2005 | Ramaswamy et al. ....... 370/337 |
| 6,904,032 B2 | 6/2005 | Cain .......................... 370/337 |
| 6,954,435 B2 | 10/2005 | Billhartz et al. ............. 370/252 |
| 6,954,449 B2 | 10/2005 | Cain et al. ................... 370/337 |
| 6,958,986 B2 | 10/2005 | Cain .......................... 370/337 |
| 6,961,325 B1 | 11/2005 | Avidor et al. ............... 370/336 |
| 6,975,863 B1 | 12/2005 | Miernik ...................... 455/434 |
| 6,980,537 B1 | 12/2005 | Liu ............................ 370/338 |
| 6,982,987 B2 | 1/2006 | Cain .......................... 370/442 |
| 6,986,161 B2 | 1/2006 | Billhartz ..................... 726/23 |
| 6,990,080 B2 | 1/2006 | Bahl et al. ................... 370/254 |
| 6,996,088 B1 | 2/2006 | Kroon et al. ................. 370/341 |
| 2006/0056442 A1 | 3/2006 | DaCosta et al. ............. 370/458 |
| 2006/0114866 A1* | 6/2006 | Kim et al. ................... 370/338 |
| 2008/0019298 A1* | 1/2008 | Rudnick ..................... 370/321 |
| 2008/0019328 A1* | 1/2008 | Rudnick ..................... 370/337 |
| 2008/0198865 A1* | 8/2008 | Rudnick et al. ............. 370/406 |

FOREIGN PATENT DOCUMENTS

| | | |
|---|---|---|
| EP | 1 662 730 | 5/2006 |
| WO | WO 2005/122710 A2 * | 12/2005 |
| WO | 2008/014208 | 1/2008 |

* cited by examiner

SYSTEM AND METHOD FOR COMMUNICATING IN A TIME DIVISION MULTIPLE ACCESS (TDMA) MESH NETWORK HAVING MINIMIZED END-TO-END LATENCY

FIELD OF THE INVENTION

The present invention relates to the field of communications, and more particularly, to communications over TDMA mesh networks.

BACKGROUND OF THE INVENTION

Mesh networking routes data, voice and instructions between nodes and allows for continuous connections and reconfiguration around blocked paths by "hopping" from one node to another node until a successful connection is established. Even if a node collapses, or a connection is bad, the mesh network still operates whether the network is wireless, wired and software interacted. This allows an inexpensive peer network node to supply back haul services to other nodes in the same network and extend the mesh network by sharing access to a higher cost network infrastructure.

Wireless mesh networking is implemented over a wireless local area network using wireless nodes. This type of mesh network is decentralized and often operates in an ad-hoc manner. The wireless nodes operate as repeaters and transmit data from nearby wireless nodes to other peers, forming a mesh network that can span large distances. In ad-hoc networking, neighbors find another route when a node is dropped. Nodes can be either fixed or mobile, with mobile devices forming a mobile ad-hoc network (MANET) known to those skilled in the art.

The mesh networks use dynamic routing capabilities. A routing algorithm ensures that data takes an appropriate and typically the fastest route to a destination. Some mobile mesh networks could include multiple fixed base stations with "cut through" high bandwidth terrestrial links operating as gateways to fixed base stations or other services, including the internet. It is possible to extend the mesh network with only a minimal base station infrastructure. There are also many different types of routing protocols that can be used in a mesh network, for example, an Ad-hoc On-Demand Distance Vector (AODV), Dynamic Source Routing (DSR), Optimized Link State Routing protocol (OLSR) and Temporally-Ordered Routing Algorithm (TORA), as non-limiting examples.

Many of the mesh networks operate using a Time Division Multiple Access (TDMA) protocol. Depending on the configuration of a TDMA mesh network, end-to-end latency can be problematic. End-to-End latency is the time it takes to deliver a piece of data, typically a data packet from a source node to a destination node. Thus, end-to-end latency can be referred to as the time duration from when the packet is presented to the data communications layer of the stack at the source node to when the packet is passed up from the data communications layer of the stack at the destination node. Multi-hop, ad-hoc wireless data communications network transmit a packet among different intermediate nodes using multiple hops as it traverses the network from a source node to a destination node. In a TDMA network, the channel time slot can be allocated before the node data is transmitted. The channel transmit time is typically allocated in a recurring slot. The channel time typically is segmented into blocks as an epoch and blocks are divided into slots used by nodes to transmit data. If the data is an isochronous stream, the data can be repeatedly generated and presented at the source node for delivery to a destination node. The data is time dependent and is delivered by a specified time.

End-to-End Latency (ETEL) is one of the more important Quality of Service (QOS) parameters that are minimized for many applications. For example, interactive two-way speech has demanding quality of service ETEL requirements. Humans are extremely sensitive to transmission delays and the typical latency needs to less than 150 msec to minimize human-perceptible objections and problems, for example, talking "over" each other in long-distance satellite conversations due to satellite delay. In a "standard" TDMA allocation, the route allocations are in no particular order in the epoch and it can take multiple epochs to traverse a route.

SUMMARY OF THE INVENTION

A system and method for communicating includes a plurality of wireless nodes forming a Time Division Multiple Access (TDMA) mesh network. Each wireless node includes a transmitter and receiver and is operative for transmitting data packets across the TDMA mesh network using a TDMA epoch such that a slot of channel time is allocated prior to a wireless node transmitting the data packet. The channel time that has been allocated to each wireless node participating in a data packet route through the TDMA mesh network within each TDMA epoch is modified to minimize end-to-end route traversal latency.

Each wireless node's allocated slot within a TDMA epoch can be ordered in route sequence. Each wireless node within a route for a data packet can have an allocated time slot in the epoch next to the allocated slots of its neighbors in the route. Each TDMA epoch can be formed as a plurality of time slots.

In yet another aspect, each wireless node that forms a transmitter and receiver can be operative for transmitting data packets across the TDMA mesh network in data packet streams in opposite directions using a TDMA epoch such that a slot of channel time is allocated prior to a wireless node transmitting the data packet and each data packet stream has a different ordering of channel allocation in each direction to form a full duplex communication.

A method aspect is also set forth that includes transmitting a data packet across a plurality of wireless nodes that form a Time Division Multiple Access (TDMA) mesh network using a TDMA epoch and allocating a slot of channel time prior to a wireless node transmitting the data packet. A TDMA channel time slot that has been allocated to each wireless node participating in the data packet route within each TDMA epoch is modified to minimize the end-to-end route traversal latency.

The data packets can be transmitted as an isochronous data stream. Any detected changes in a route for a data packet can create a change for allocation. Also, the method can include the step of making an allocation request while previous requests are active.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art.

In accordance with a non-limiting example of the present invention, an express Quality of Service (QOS) TDMA channel time allocation algorithm seeks to sequence allocations along the route and within the epoch, in a hop order with no wasted intervening time between adjacent allocations to minimize End-to-End Latency (ETEL), although there may be an intervening time between adjacent slots, for example, slot guard times.

Express quality of service algorithm is an extension of the TDMA channel allocation algorithm to minimize end-to-end latency along a route across a multi-hop mesh network. In accordance with a non-limiting example of the present invention, a system and method permits latency-minimizing extension to the TDMA algorithm and accomplishes this by sequencing both in time and in the epoch each hop's transmission channel time allocation to minimize the time between hops. The express quality of service algorithm can substantially reduce the latency experienced by packets belonging to a quality of service stream flowing across a wireless TDMA multi-hop mesh network. This superior performance can minimize QOS latency and is particularly relevant to demanding quality of service-sensitive applications such as two-way real-time voice.

Figure 1:
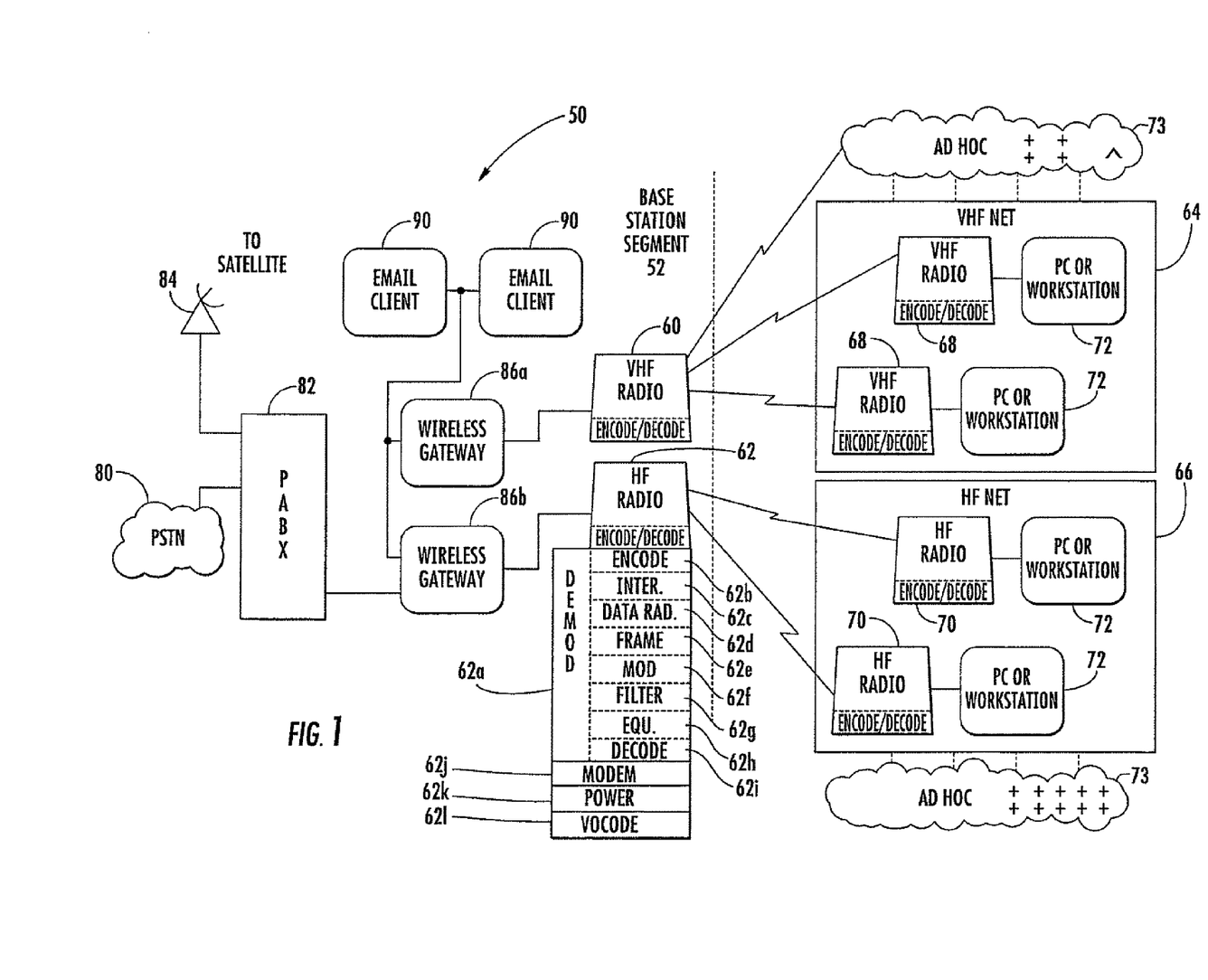
FIG. 1 is a block diagram of an example of a communications system that can be modified for use with the present invention.

An example of a communications system that can be used and modified for use with the present invention is now set forth with regard to FIG. 1.

An example of a radio that could be used with such system and method is a Falcon™ III radio manufactured and sold by Harris Corporation of Melbourne, Fla. It should be understood that different radios can be used, including software defined radios that can be typically implemented with relatively standard processor and hardware components. One particular class of software radio is the Joint Tactical Radio (JTR), which includes relatively standard radio and processing hardware along with any appropriate waveform software modules to implement the communication waveforms a radio will use. JTR radios also use operating system software that conforms with the software communications architecture (SCA) specification (see www.jtrs.saalt.mil), which is hereby incorporated by reference in its entirety. The SCA is an open architecture framework that specifies how hardware and software components are to interoperate so that different manufacturers and developers can readily integrate the respective components into a single device.

The Joint Tactical Radio System (JTRS) Software Component Architecture (SCA) defines a set of interfaces and protocols, often based on the Common Object Request Broker Architecture (CORBA), for implementing a Software Defined Radio (SDR). In part, JTRS and its SCA are used with a family of software re-programmable radios. As such, the SCA is a specific set of rules, methods, and design criteria for implementing software re-programmable digital radios.

The JTRS SCA specification is published by the JTRS Joint Program Office (JPO). The JTRS SCA has been structured to provide for portability of applications software between different JTRS SCA implementations, leverage commercial standards to reduce development cost, reduce development time of new waveforms through the ability to reuse design modules, and build on evolving commercial frameworks and architectures.

The JTRS SCA is not a system specification, as it is intended to be implementation independent, but a set of rules that constrain the design of systems to achieve desired JTRS objectives. The software framework of the JTRS SCA defines the Operating Environment (OE) and specifies the services and interfaces that applications use from that environment. The SCA OE comprises a Core Framework (CF), a CORBA middleware, and an Operating System (OS) based on the Portable Operating System Interface (POSIX) with associated board support packages. The JTRS SCA also provides a building block structure (defined in the API Supplement) for defining application programming interfaces (APIs) between application software components.

The JTRS SCA Core Framework (CF) is an architectural concept defining the essential, "core" set of open software Interfaces and Profiles that provide for the deployment, management, interconnection, and intercommunication of software application components in embedded, distributed-computing communication systems. Interfaces may be defined in the JTRS SCA Specification. However, developers may implement some of them, some may be implemented by non-core applications (i.e., waveforms, etc.), and some may be implemented by hardware device providers.

For purposes of description only, a brief description of an example of a communications system that could incorporate the "bandwidth scavenging," in accordance with non-limiting examples of the present invention, is described relative to a non-limiting example shown in FIG. 1. This high-level block diagram of a communications system 50 includes a base station segment 52 and wireless message terminals that could be modified for use with the present invention. The base station segment 52 includes a VHF radio 60 and HF radio 62 that communicate and transmit voice or data over a wireless link to a VHF net 64 or HF net 66, each which include a number of respective VHF radios 68 and HF radios 70, and personal computer workstations 72 connected to the radios 68,70. Ad-hoc communication networks 73 are interoperative with the various components as illustrated. Thus, it should be understood that the HF or VHF networks include HF and VHF net segments that are infrastructure-less and operative as the ad-hoc communications network. Although UHF radios and net segments are not illustrated, these could be included.

The HF radio can include a demodulator circuit 62a and appropriate convolutional encoder circuit 62b, block interleaver 62c, data randomizer circuit 62d, data and framing circuit 62e, modulation circuit 62f, matched filter circuit 62g, block or symbol equalizer circuit 62h with an appropriate clamping device, deinterleaver and decoder circuit 62*i* modem 62*j*, and power adaptation circuit 62*k* as non-limiting examples. A vocoder circuit 62*l* can incorporate the decode and encode functions and a conversion unit which could be a combination of the various circuits as described or a separate circuit. These and other circuits operate to perform any functions necessary for the present invention, as well as other functions suggested by those skilled in the art. Other illustrated radios, including all VHF mobile radios and transmitting and receiving stations can have similar functional circuits.

The base station segment 52 includes a landline connection to a public switched telephone network (PSTN) 80, which connects to a PABX 82. A satellite interface 84, such as a satellite ground station, connects to the PABX 82, which connects to processors forming wireless gateways 86*a*, 86*b*. These interconnect to the VHF radio 60 or HF radio 62, respectively. The processors are connected through a local area network to the PABX 82 and e-mail clients 90. The radios include appropriate signal generators and modulators.

An Ethernet/TCP-IP local area network could operate as a "radio" mail server. E-mail messages could be sent over radio links and local air networks using STANAG-5066 as second-generation protocols/waveforms, the disclosure which is hereby incorporated by reference in its entirety and, of course, preferably with the third-generation interoperability standard: STANAG-4538, the disclosure which is hereby incorporated by reference in its entirety. An interoperability standard FED-STD-1052, the disclosure which is hereby incorporated by reference in its entirety, could be used with legacy wireless devices. Examples of equipment that can be used in the present invention include different wireless gateway and radios manufactured by Harris Corporation of Melbourne, Fla. This equipment could include RF5800, 5022, 7210, 5710, 5285 and PRC 117 and 138 series equipment and devices as non-limiting examples.

These systems can be operable with RF-5710A high-frequency (HF) modems and with the NATO standard known as STANAG 4539, the disclosure which is hereby incorporated by reference in its entirety, which provides for transmission of long distance HF radio circuits at rates up to 9,600 bps. In addition to modem technology, those systems can use wireless email products that use a suite of data-link protocols designed and perfected for stressed tactical channels, such as the STANAG 4538 or STANAG 5066, the disclosures which are hereby incorporated by reference in their entirety. It is also possible to use a fixed, non-adaptive data rate as high as 19,200 bps with a radio set to ISB mode and an HF modem set to a fixed data rate. It is possible to use code combining techniques and ARQ.

There now follows a description of "bandwidth scavenging" followed by a more detailed explanation of the Quality of Service enhancements that address the end-to-end latency problems identified above. It should be understood that many of the mesh networks operate using a Time Division Multiple Access (TDMA) protocol. Depending on the configuration of a TDMA mesh network, a large portion or even a majority of configured bandwidth can be wasted. This can be true even when considering a maximum possible theoretical channel utilization.

TDMA mesh networks typically include a plurality of wireless nodes that communicate with each other using primary and secondary frequencies and using TDMA epochs that are divided into a beacon interval operative as a network control interval, sometimes a digital voice (DV) interval, and a digital data (DD) interval. For purposes of this description, TDMA mesh networks use a slot of channel time that is allocated prior to a node actually transmitting data during the allocated slot. Details of how the TDMA channel allocation mechanism works is not described in detail because it is sufficient that some algorithm is used to allocate a potentially recurring slot of channel time in which a particular node may transmit the data.

TDMA channel time allocation algorithms typically segment channel time into blocks. Each block is an epoch. Blocks are subdivided into slots used by nodes to transmit data. It is assumed that the data to be transmitted constitutes an isochronous stream, meaning that large portions of data are repeatedly generated and presented at the source node for delivery to the destination node. The data is typically time dependent, and must be delivered within certain time constraints. Multiple frequencies can be allocated to a single TDMA mesh network using a primary frequency and a plurality of secondary frequencies, sometimes up to four secondary frequencies in non-limiting examples.

Figure 2:
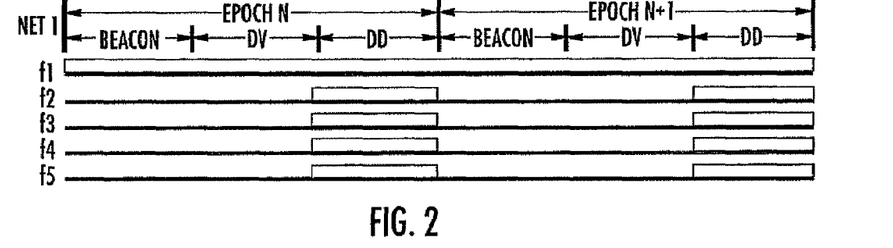
FIG. 2 is a graph showing the frequency use for a single TDMA mesh network.

As shown in FIG. 2 for a TDMA mesh network, only the digital data interval actually uses some of the secondary frequencies. All secondary frequencies during the beacon and digital voice intervals are unused. These unused portions of allocated frequencies can be referred to as wasted channel time, or more simply as channel wastage. Depending upon the relative sizes of the beacon, digital voice and digital data intervals, and how many secondary frequencies are allocated, a majority of allocated bandwidth can consist of channel wastage.

Of course, it is possible to configure TDMA mesh networks to minimize channel wastage. For example, a TDMA mesh network could be configured using only the primary frequency and no secondary frequencies, resulting in no channel wastage. Whenever any secondary frequencies are allocated, however, channel wastage occurs. Even in this case channel wastage can be minimized by maximizing the relative size of the digital data interval at the expense of any beacon and digital voice interval sizes. Unfortunately, there are practical constraints limiting how much channel wastage can be limited.

Beacon interval size is typically dictated by the number of nodes in the TDMA mesh network, for example, typically wireless nodes and often mobile or fixed nodes, as in a mobile ad-hoc network (MANET). More nodes mean a larger beacon interval. Digital voice or video interval size is dictated by the expected peak requirement for simultaneous digital voice and video services. These digital voice and video intervals can usually be reduced below an expected peak need at the cost of failing to provision the peak need at the likely cost of the digital voice or video failing to work exactly when it is most needed by the user in the field.

Figure 3:
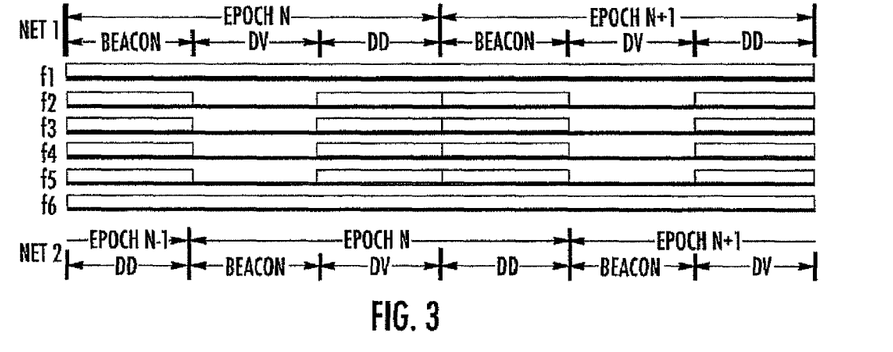
FIG. 3 is a graph similar to FIG. 1, but showing the frequency use overlap as "bandwidth scavenging" for two TDMA mesh networks, listed as Net 1 and Net 2.

The solution to channel wastage is achieved by recognizing that a second TDMA mesh network, for example, termed "Net 2" in FIG. 3, can use the unused TDMA portions of the first ("Net 1") TDMA mesh network's secondary frequencies, for its secondary frequency digital data usage. In effect, the system can scavenge a part of the secondary frequency channels unused by the first TDMA mesh network, thereby reducing channel wastage.

An example of the "bandwidth scavenging" as described is shown in FIG. 3. For example, a sixth frequency, f6, is allocated and used as the primary frequency for the second TDMA mesh network. Its start of epoch is offset from the start of epoch for the first TDMA mesh network, such that the digital data secondary frequency TDMA usage for the second TDMA mesh network falls in the unused parts of the secondary frequency usage map of the first TDMA mesh network. In this non-limiting example, channel wastage has been reduced by about 50%.

It should be understood that "bandwidth scavenging" as described requires several functions as follows:

1. Allocate a new, currently unused frequency for the second TDMA mesh network primary frequency;

2. Offset the start of epoch for the second TDMA mesh network from the start of epoch for the first TDMA mesh network so that the secondary frequency usage of the second TDMA mesh network falls in the unused portion of the secondary frequency usage map of the first TDMA mesh network; and 3. Maintain the start of epoch offsets during overlapping operation.

Allocating a new, currently unused frequency such as the primary frequency (number 1 above) can be done during the TDMA mesh network's initial configuration, or can be accomplished automatically via a configuration allowing automatic "bandwidth scavenging" in accordance with non-limiting examples of the present invention.

Establishing the initial start of epoch offset (number 2 above) can be accomplished with minimal steps. When a TDMA mesh network, e.g., the second TDMA mesh network, hears another mesh network, e.g., the first TDMA mesh network, with which it wishes to perform bandwidth scavenging, those radios or wireless nodes for the second TDMA mesh network that hear the radios or wireless nodes in the first TDMA mesh network create an artificial, or "phantom" radio or node, whose start of epoch is at the desired offset based upon the inferred start of epoch for the first TDMA mesh network. This "phantom" node is included in the second TDMA mesh network node's network synchronization algorithm, i.e., epoch synchronization, beacon synchronization or smoothing algorithm. The effect of including this "phantom" node is to gradually and systematically move the second TDMA mesh network's start of epoch to the desired offset. Other algorithms to establish the initial start of epoch offset are also possible.

Maintaining a start of epoch offset after the offset was first accomplished (number 2 listed above) also takes minimal steps. The "phantom" nodes in the network synchronization algorithm can be continued.

The "bandwidth scavenging" algorithm as described is flexible regardless of the configuration of the overlapping TDMA mesh network. This is because during the beacon interval only the primary frequency can be used by a TDMA mesh network. Thus, the beacon interval portion of the TDMA mesh network's secondary frequency map is usually available for use by other TDMA mesh networks. As a result, the "bandwidth scavenging" as described can be used, even when the overlapping TDMA mesh network's digital voice interval has been eliminated.

Extensions of this type of system are also possible. As part of its coexistence configuration, a TDMA mesh network can be configured to shift automatically to "bandwidth scavenging" as described when encountering another TDMA mesh network either to expand its effective bandwidth or to conserve the overall used bandwidth.

Figure 4:
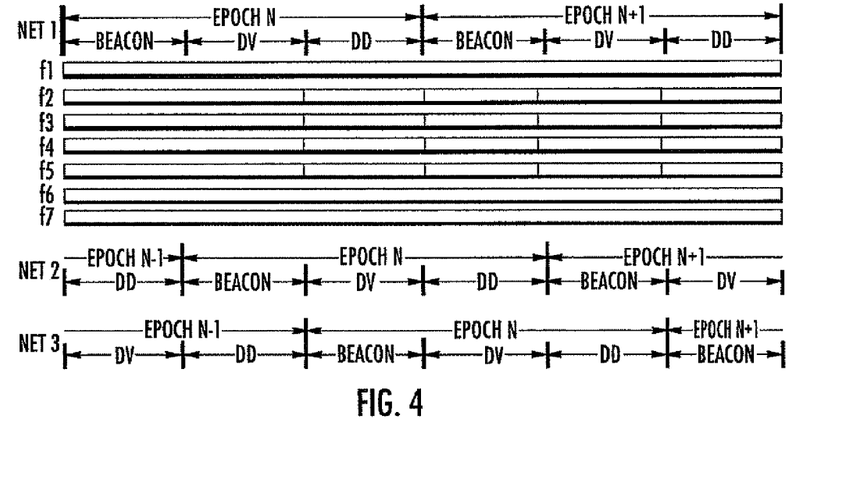
FIG. 4 is another graph showing the frequency use overlap as "bandwidth scavenging" for three TDMA mesh networks listed as Net 1, Net 2, and Net 3.

Another extension is to use bandwidth scavenging to overlap more than two TDMA mesh networks. An example of this for three TDMA mesh networks is shown in FIG. 4, which shows a chart similar to FIG. 3, but now showing a third TDMA mesh network, "Net 3," which is overlapped by allocating its primary frequency, f7, and aligning this third TDMA mesh network's start of epoch to allow its digital data secondary frequency usage to overlap or fall within the unused portions of the first and second TDMA mesh network's secondary frequency usage maps.

In some examples, the available unused secondary frequency gaps are too small to fit the alternate third TDMA mesh network's digital data interval. This is not a serious drawback, and possible alternative mechanisms can handle this situation.

"Bandwidth scavenging" as described is relevant to many RF communications devices. Multiple secondary frequencies can be used to extend total radio or wireless node bandwidth, and use the secondary frequencies during a digital data interval. As a result, these frequencies are wasted during digital voice, digital video, and during beacon intervals. "Bandwidth scavenging" as described allows any wasted parts of the secondary frequencies to be used when multiple TDMA mesh networks are present.

A TDMA type scheme can also be applied in a coarse-grained fashion to a TDMA mesh network radio frequency versus time usage characteristics to allow these TDMA mesh networks to "scavenge" the unused parts of each other's secondary frequencies, by offsetting in time each TDMA mesh network's secondary frequency usage with respect to the other(s). Bandwidth scavenging can be used in TDMA mesh networks to accomplish reuse of the otherwise wasted parts of wireless nodes or radio's secondary frequencies.

It should be understood that a TDMA mesh network architecture can be formed of different types, and a TDMA epoch in a non-limiting example as set forth comprises a network control interval as a beacon interval and digital data interval. A network control interval as a plurality of beacons uses only the primary frequency. The digital data interval uses both the primary and secondary frequencies via the TDMA channel allocation.

It is possible to reduce the requirements that any secondary frequency usage interdigitates, i.e., be non-overlapping. It should be understood that multiple TDMA mesh networks should be synchronized. Non-overlapping of secondary frequency usage, while desirable and optimal, is not strictly required. Thus, non-overlapping secondary frequency usage could be shown as an example of a more general inter-meshing network synchronization.

A "phantom node" synchronization algorithm can allow synchronization between and among multiple mobile, ad-hoc, and TDMA mesh networks. Moreover, there are several ways "bandwidth scavenging" could accomplish inter-network synchronization. Phantom node synchronization is just one.

A "phantom node" synchronization algorithm achieves and maintains synchronization between and among multiple mobile, ad-hoc, mesh networks independent from "bandwidth scavenging" as described above in accordance with non-limiting examples of the present invention. As such, this type of "phantom node" synchronization algorithm can be useful not just for "bandwidth scavenging" inter-meshed TDMA mesh network synchronization, but also useful when multiple mesh networks should be synchronized for other reasons, e.g., to simplify the job of gateway nodes or simplify the coexistence and interoperability of multiple TDMA mesh networks on the same frequency in the same place.

One non-limiting example is a gateway between two high performance TDMA mesh networks that typically communicates using a TDMA epoch that has a beacon interval, digital voice interval, and digital data interval. The gateway node could be a member of both TDMA mesh networks. The gateway node should transmit two beacons, one for each of the two TDMA mesh networks. If the two TDMA mesh networks are not synchronized, however, problems could arise. For example, sometimes the beacon transmit times for the two beacon transmissions will overlap. Because it is unattractive cost-wise to include two independent radios in the gateway node, typically a wireless node, the gateway node will be able to transmit one of the two beacons. Moreover, even if the gateway did have two independent radios in the one node, when both TDMA mesh networks are operating on the same frequency, only a single beacon would be transmitted at a time. Otherwise, a collision would occur with the result that no node would correctly receive either beacon. With the two overlapping TDMA mesh networks having the same epoch duration, or an integer multiple thereof, it could be synchronized for simplifying the gateway node's operation. This inter-network gateway functionality is an example of interoperability.

Coexistence is another example when the system might want to synchronize the operation of multiple TDMA mesh networks. It is desirable for the beacon interval of each TDMA mesh network to fall within the digital data interval, and in some networks, the digital voice and/or digital data interval of the co-located TDMA mesh networks, so that each TDMA mesh network's beacon transmissions would not collide with those of the other TDMA mesh networks. A TDMA mesh network could make an artificial reservation during a digital data interval corresponding to the other TDMA mesh networks beacon interval. As a result, two TDMA mesh networks prevent any of their nodes from making digital data transmissions or beacon transmissions that would collide with the other TDMA mesh networks' beacon transmissions. For a TDMA mesh network to continue to function reliably and robustly, many of its beacon transmissions must be correctly received by neighboring nodes in the TDMA mesh network. In this case, synchronization is needed such that these "artificial" TDMA channel reservations are stationary with respect to the other TDMA mesh networks' beacon intervals.

"Phantom node synchronization" is a simple and robust technique to achieve synchronization and maintain synchronization between potentially multiple TDMA mesh networks, completely independent of the reasons why the synchronization is desired.

In accordance with non-limiting examples of the present invention, the problem of minimizing end-to-end latency is also addressed. In this description quality of service can typify the deliver of real-time data and the problem of minimizing end-to-end latency is addressed, particularly in a multi-hop ad-hoc wireless network. It should be understood that the time taken by over-the-air (OTA) headers, inter-frame spaces, cyclic redundancy checks (CRC), trailers, stuff bits, and the like are typically treated as part of the OTA transmission time.

Quality of Service (QoS) parameters are optimized when delivering real-time data across a data communications network, and typically include end-to-end latency, jitter, throughput and reliability. The description as follows focuses on end-to-end latency.

End-to-end latency can be defined as the time it takes to deliver a data packet from a source node to a destination node. End-to-end latency can also be defined as the time duration from when the data packet is presented to the data communications layer of the stack at the source node, to when the data packet is passed up from the data communication layer of the stack at the destination node. End-to-end jitter can be defined as the variance of end-to-end latency, sometimes expressed as the standard deviation of latency.

In a multi-hop, ad-hoc, wireless data communications network, a packet will, in general, be transmitted multiple times, i.e., take multiple hops, as it traverses the network from the source node to the destination node. For purposes of this description, TDMA mesh networks use a slot of channel time that is allocated prior to a node actually transmitting data during the allocated slot. Details of how the TDMA channel allocation mechanism works are not described in detail because it is sufficient that some algorithm is used to allocate a recurring slot of channel time in which a particular node may transmit the data. TDMA channel time allocation algorithms typically segment channel time into blocks. Each block is an epoch. Blocks are subdivided into slots used by nodes to transmit data. It is assumed that the data to be transmitted constitutes an isochronous stream, meaning that large portions of data are repeatedly generated and presented at the source node for delivery to the destination node. The data is typically time dependent, and must be delivered within certain time constraints.

When a data packet traverses the TDMA mesh network from a source node to a destination node, it will be transmitted by some sequence of nodes. For example, this sequence consists of nodes A, B, C, and D to destination node E, where node A is the source node. For example purposes, the system assumes each transmitted data packet is successfully received by each hop's destination node.

Figure 5:
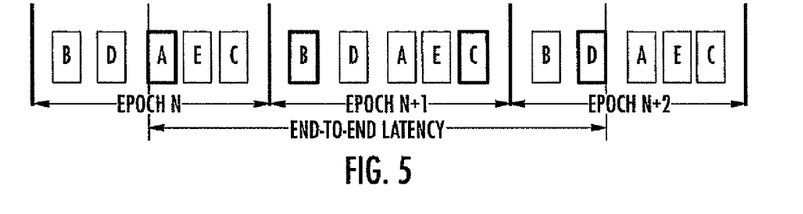
FIG. 5 is a chart showing non-express, Quality of Service (QOS) TDMA channel allocation, and showing how a data packet can travel from a source node A to a destination node E when transmitted by nodes and crossing the TDMA network, in accordance with a non-limiting example of the present invention.

FIG. 5 is a timing chart illustrating how a particular data packet may travel from source node A to destination node E when transmitted by each node crossing the TDMA mesh network based upon a non-express-QoS (Quality of Service) TDMA channel allocation algorithm. Each node carrying the isochronous data stream across the TDMA mesh network has been granted a slot by the TDMA algorithm that repeats in each TDMA epoch. During TDMA epoch N, source node A transmits the data packet to node B during the first TDMA epoch. Next, during TDMA epoch N+1, node B transmits the data packet to node C, and node C transmits it to node D. Finally, during TDMA epoch N+2, node D transmits the data packet to node B, the final destination. The end-to-end over-the-air (OTA) latency for the data packet's traversal is just under two TDMA epochs. OTA latency includes neither stack processing time, the time to travel up/down the stack within the source and destination nodes, nor the time the data packet waits in the queue at the source node for arrival of the source node's allocated transmission time, which is shown as the first 'A' channel time allocation in TDMA epoch N in FIGS. 5 and 6.

Figure 6:
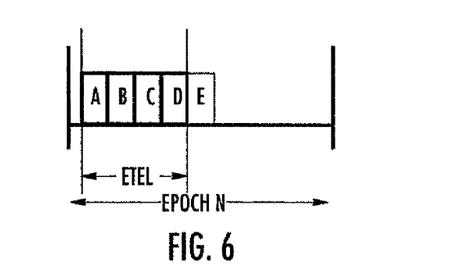
FIG. 6 is a chart showing an express Quality of Service and End-to-End Latency (ETEL), in accordance with a non-limiting example of the present invention.

The bold-lined portions in FIGS. 5 and 6 represent data packets transmitted over-the-air (OTA). No data packet is transmitted in "the slot" for node E. The slot is present to show that node E exists. It could be considered an "imaginary" slot. This is where node E may transmit if it were to transmit an OTA data packet if it were not a destination node. Because node E can be a distraction node, it only receives packets in this example and never transmits a data packet.

The system analyzes hop latencies that fit together along the route traversed, with the express Quality of Service (QoS) algorithm as described to reduce end-to-end latency. End-to-end OTA route traversal latency can be substantially reduced by modifying the TDMA channel time allocation algorithm to order the transmission allocation to each node participating in the data stream's route within each TDMA epoch as shown in FIG. 6.

Minimum end-to-end latency can be achieved when the next-hop's TxOp (transmission opportunity) for the data stream whose latency the system is trying to minimize occurs as soon as possible after the QoS data packet to be relayed is received, ideally at the data slot following reception. When viewed as a sequence of TxOps, the optimal QoS TxOp sequence consists of a series of adjacent time-sequential TxOps in the epoch, from the source node to destination node, one TxOp for each hop. By paying attention to how hop latencies fit together, and then optimally ordering the resulting sequence of channel time allocations within the epoch, the end-to-end latency shown in FIG. 6 is reduced to less than half an epoch.

To achieve minimal OTA end-to-end latency, the Express QoS allocation algorithm can order each node's recurring transmission time within the epoch in route-traversal sequence, i.e., sequentially in the epoch data interval from a source node to a destination node. This provides the majority of end-to-end OTA latency reduction.

In addition, the Express QoS allocation algorithm can place each allocation in the route sequence as close as possible to its neighboring allocations in the route sequence. Though not as important as the ordering of allocated slots, this provides some additional reduction in end-to-end OTA latency and allows longer routes to fit within single epoch.

For Express QoS to be able to reduce end-to-end latency, sufficient channel time, i.e., slots, should be available and unallocated such that Express QoS has a choice of allocations at multiple nodes along the route. The more slot choices Express QoS has available, the more it can minimize end-to-end latency.

The Express QoS allocation algorithm can coordinate local node channel time allocation across the spatial extent of the source-to-destination traversal route. This requires some inter-node communication. Typically, communication between adjacent nodes is required and communication beyond adjacent neighbors along the route is not required.

It should be understood that full duplex operation in wireless TDMA mesh networks is typically achieved by creating two data streams, one stream for each direction of travel. Express QoS as described requires a different ordering of channel allocations for each direction, since an optimal slot allocation sequence in one direction will be a worst-case allocation for the opposite direction.

Express QoS as described can substantially reduce the latency experienced by packets belonging to a QoS data stream flowing across a wireless TDMA "multi-hop" mesh network. This improved QoS latency as described is applicable to demanding QoS-sensitive applications, such as two-way real-time voice.

To quantify and characterize the latency improvement that can be expected, consider the expected latency of a packet traveling across a wireless TDMA mesh network of diameter "D" from one edge of the network to the opposite edge. In all cases at each hop the placement of the transmission slot within the TDMA epoch's digital data interval is entirely dependent upon the details of the operation of the TDMA channel allocation algorithm. Many algorithms are possible. Unless the algorithm explicitly optimizes relative slot positions along the route so as to minimize the latency experienced by packets traversing that route, however, there is no reason to expect the data packets will achieve an "average" per-hop traversal latency of less than the approximate 0.5 TDMA epochs expected by random slot placement. Using the Express QoS TDMA channel allocation algorithm as described, however, per-hop traversal latency as low as the OTA data transmission time can be achieved provided all allocation can be fit within a single epoch. As shown in FIG. 6, using Express QoS as described, a data packet can traverse the entire route in less than a single epoch.

Express QOS is an extension of the TDMA channel allocation algorithm to minimize end-to-end latency along a route across a multi-hop TDMA mesh network, adding a latency-minimizing extension to the TDMA algorithm.

There are other possible extensions. For example, when nodes move, established pre-existing routes can change. Because the express QOS TDMA channel time allocations are route-dependent, when nodes move and routes change, the express QOS channel time allocation algorithm/mechanism must revisit and refigure-out what is the best, i.e., the lowest latency, allocations and make changes in the pre-existing allocations accordingly. This refiguring-out could be triggered by detecting changes in a route or be accomplished periodically with the re-do frequency based on a metric for how rapidly the relevant parts or overall network typology changes.

It is also possible to consider what happens when a new express QOS allocation request is made while previous requests are still active. When this happens, it is likely to be beneficial to revisit previously granted request, i.e., the allocations previously made, in order to optimize the efficiency of the allocations considered as a whole, i.e., minimize the latency across all active express quality of service streams, both old and new.

It is also possible to use an Optimized Link State Routing (OLSR) in similar over-the-air (OTA) packet data and exchange link-state routing algorithms. The OLSR can be adapted to handle multiple waveforms having different radio ranges by running multiple OLRS processes (MOP), a separate OLSR process in each node for each of the waveforms. Each OLSR process can perform its independent set of HELLO and TC message transmissions using a different waveform. Each OLSR process can build a model of network conductivity, based on its waveform's range, in the usual OLSR fashion.

Each OLSR process can construct a routing table for its waveform's conductivity and a single composite routing table can be build from the collection of waveform routing tables. Composite routing tables can be constructed depending upon what routing criteria or combination of criteria are optimized. The possible routing criteria can be optimized, including combinations of a minimum number of hops; a minimum end-to-end latency; a maximum data throughput; congestion avoidance; minimum power consumption; a higher reliability such as the fewest dropped packets; and a minimum bandwidth used.

It is also possible to reduce the bandwidth and computational expense. Instead of running a parallel OLSR process in each node for each waveform, only a single OLSR process is run in each node. This single OLSR process can be modified to exchange a separate and independent set of one-hop-neighbor HELLO messages for each waveform. The HELLO message could contain only one-hop neighborhood information for that waveform. Each node can build a two-hop neighborhood for each waveform.

The OLSR state table can be extended to segregate link state information for each one-hop neighbor by a waveform. Each node's one-hop neighborhood for each waveform can be distributed in a single TC message. This provides each node the information it requires to build its network topology model of connectivity for each waveform. This multi-waveform network topology builds its own composite route table. The improvement merges the multiple OLSR processes of MOP into a single OLSR process while keeping independent HELLO messaging for each waveform. Instead of transmitting separate TC messages for each waveform, every waveform's one-hop neighborhood is included in a single TC message. The bandwidth consumed is significantly reduced, along with the computational and memory burdens of a separate OLSR process per waveform and processing of separate TC message data streams for each waveform.

Also, OLSR messages can be transmitted using only a "base" waveform that may or may not be the longest range waveform. Reception characteristics of each received OLSR packet on the base waveform are recorded. A heuristic based upon observed OLSR packet reception characteristics and previously characterized relative performance of the different waveforms is used to predict each node's one-hop neighborhood conductivity for each non-base waveform. It is also possible to perform reception-characteristics-to-one-hop-neighborhood inference after receiving each node's TC message instead of before generating each node's TC message.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for communicating, comprising:
a plurality of wireless nodes configurable to form a first time division multiple access (TDMA) mesh network and a second TDMA mesh network;
each wireless node of the plurality of wireless nodes comprising a transmitter, and a receiver,
wherein said each wireless node is configured to transmit data packets across said first TDMA mesh network or said second TDMA mesh network from a source node through intermediate neighboring nodes to a destination node on a primary frequency and at least one secondary frequency using a TDMA epoch that is divided into at least a beacon interval using the primary frequency and a digital data interval using the primary frequency and the at least one secondary frequency;
said each wireless node configured to overlap frequency usage on the at least one secondary frequency between said first TDMA mesh network and said second TDMA mesh network,
wherein a slot of channel time is allocated in both time and in TDMA epoch prior to a wireless node of the plurality of wireless nodes transmitting the data packets;
said first TDMA mesh network and said second TDMA mesh network allocate an unused portion of the at least one secondary frequency to the second TDMA mesh network, such that the digital data interval for the second TDMA mesh network does not fall into a used portion of the at least one secondary frequency allocated to the first TDMA mesh network; and
said plurality of wireless nodes refigure-out a lowest latency after detecting changes in a route.

2. The system according to claim 1, wherein each TDMA channel time slot of a wireless node is positioned in sequential route-transversal order in the TDMA epoch from a source node through intermediate nodes to a destination node.

3. The system according to claim 1, wherein each wireless node within a route for a data packet has an allocated time slot in the TDMA epoch following the allocated time slot of its preceding neighbor in the route.

4. The system according to claim 1, wherein each wireless node within a route for a data packet has an allocated time slot in the TDMA epoch immediately following the allocated time slot of its preceding neighbor in its route.

5. A system for communicating, comprising:
a plurality of wireless nodes configurable to form a first time division multiple access (TDMA) mesh network and a second TDMA mesh network;
each wireless node of the plurality of wireless nodes comprising a transmitter, and a receiver,
wherein said each wireless node is configured to transmit data packets across said first TDMA mesh network or said second TDMA mesh network from a source node through intermediate neighboring nodes to a destination node on a primary frequency and at least one secondary frequency using a TDMA epoch that is divided into at least a beacon interval using the primary frequency and a digital data interval using the primary frequency and the at least one secondary frequency;
said each wireless node configured to overlap frequency usage on the at least one secondary frequency between said first TDMA mesh network and said second TDMA mesh network,
wherein a slot of channel time is allocated in both time and in TDMA epoch prior to a wireless node of the plurality of wireless nodes transmitting the data packets;
said first TDMA mesh network and said second TDMA mesh network allocate an unused portion of the at least one secondary frequency to the second TDMA mesh network, such that the digital data interval for the second TDMA mesh network does not fall into a used portion of the at least one secondary frequency allocated to the first TDMA mesh network;
each data packet stream has a different ordering of channel allocation in each direction for full duplex communications; and
said plurality of wireless nodes refigure-out a lowest latency after detecting changes in a route.

6. The system according to claim 5, wherein each TDMA channel time slot of a wireless node is positioned in sequential route-traversal order in the TDMA epoch from a source node through intermediate nodes to a destination node.

7. The system according to claim 5, wherein each wireless node within a route for a data packet has an allocated time slot in the epoch following the allocated time slot of its preceding neighbor in the route.

8. The system according to claim 5, wherein each wireless node within a route for a data packet has an allocated time slot in the TDMA epoch immediately following the allocated time slot of its preceding neighbor in its route.

9. A method for communicating, which comprises:
transmitting a data packet across a plurality of wireless nodes that form a first time division multiple access (TDMA) mesh network and a second TDMA mesh network from a source node through intermediate neighboring routes to a destination node on a primary frequency and at least one secondary frequency using a TDMA epoch that is divided into at least a beacon interval using the primary frequency and a digital data interval using the primary frequency and the at least one secondary frequency,
wherein said each wireless node is configured to overlap frequency usage on the at least one secondary frequency between said first TDMA mesh network and said second TDMA mesh network; and
allocating in both time and TDMA epoch a slot of channel time prior to a wireless node of the plurality of wireless nodes transmitting the data packets,
wherein said plurality of wireless nodes of said first TDMA mesh network and said second TDMA mesh network allocate an unused portion of the at least one secondary frequency to the second TDMA mesh network such that the digital data interval for the second TDMA mesh network does not fall into a used portion of the at least one secondary frequency allocated to the first TDMA mesh network; and refigure refiguring out a lowest latency after detecting changes in a route.

10. The method according to claim 9, which further comprises placing each TDMA channel time slot for a wireless node in sequential route-traversal order in the TDMA epoch from a source node through the intermediate nodes to a destination node.

11. The method according to claim 9, which further comprises allocating a time slot in the TDMA epoch following the allocated time slot of its preceding neighboring node in the route.

12. The method according to claim 9, which further comprises ordering a channel time allocation in the epoch of a wireless node to match the order in a source-to-destination traversal route.

13. The method according to claim 9, which further comprises detecting changes in a route for the data packet and changing an allocation.

14. The method according to claim 9, which further comprises making an allocation request while previous requests are active.

15. The method according to claim 9, which further comprises allocating a slot of channel time in which a wireless node may transmit a data packet.

16. The method according to claim 15, which further comprises allocating the slot of channel time in which a wireless node may transmit a data packet from a data stream to recur in each successive epoch.

17. The method according to claim 9, which further comprises transmitting the data packets as an isochronous data stream.

18. A method for communicating, which comprises:

transmitting a data packet across a plurality of wireless nodes that form a first time division multiple access (TDMA) mesh network and a second TDMA mesh network from a source node through intermediate neighboring routes to a destination node on a primary frequency and at least one secondary frequency using a TDMA epoch that is divided into at least a beacon interval using the primary frequency and a digital data interval using the primary frequency and the at least one secondary frequency, wherein said each wireless node is configured to overlap frequency usage on the at least one secondary frequency between said first TDMA mesh network and said second TDMA mesh network; and allocating in both time and TDMA epoch a slot of channel time prior to a wireless node of the plurality of wireless nodes transmitting the data packets, wherein said plurality of wireless nodes of said first TDMA mesh network and said second TDMA mesh network allocate an unused portion of the at least one secondary frequency to the second TDMA mesh network such that the digital data interval for the second TDMA mesh network does not fall into a used portion of the at least one secondary frequency allocated to the first TDMA mesh network; and ordering channel allocations for a full duplex communication; and refiguring out a lowest latency after detecting changes in a route.

19. The method according to claim 18, which further comprises placing each wireless node's TDMA channel time slot in sequential route-traversal order in the TDMA epoch from a source node through the intermediate nodes to a destruction node.

20. The method according to claim 18, which further comprises allocating a time slot in the TDMA epoch following the allocated time slot of its preceding neighboring node in the route.

21. The method according to claim 18, which further comprises ordering a channel time allocation in the epoch of a wireless node to match the order in a source-to-destination traversal route.

22. The method according to claim 18, which further comprises detecting changes in a route for the data packet and changing an allocation.

23. The method according to claim 18, which further comprises making an allocation request while previous requests are active.

24. The method according to claim 18, which further comprises allocating a slot of channel time in which a wireless node may transmit a data packet.

25. The method according to claim 24, which further comprises allocating the slot of channel time in which a wireless node may transmit a data packet from a data stream to recur in each successive epoch.

26. The method according to claim 18, which further comprises transmitting the data packets as an isochronous data stream.

27. A method for communicating, which comprises:

transmitting a data packet across a plurality of wireless nodes that form a first time division multiple access (TDMA) mesh network and a second TDMA mesh network from a source node through intermediate neighboring routes to a destination node on a primary frequency and at least one secondary frequency using a TDMA epoch that is divided into at least a beacon interval using the primary frequency and a digital data interval using the primary frequency and the at least one secondary frequency, wherein said each wireless node is configured to overlap frequency usage on the at least one secondary frequency between said first TDMA mesh network and said second TDMA mesh network; and allocating in both time and TDMA epoch a slot of channel time prior to a wireless node of the plurality of wireless nodes transmitting the data packets, wherein said plurality of wireless nodes of said first TDMA mesh network and said second TDMA mesh network allocate an unused portion of the at least one secondary frequency to the second TDMA mesh network such that the digital data interval for the second TDMA mesh network does not fall into a used portion of the at least one secondary frequency allocated to the first TDMA mesh network; and making an allocation request while previous requests are active.

28. A method for communicating, which comprises:

transmitting a data packet across a plurality of wireless nodes that form a first time division multiple access (TDMA) mesh network and a second TDMA mesh network from a source node through intermediate neighboring routes to a destination node on a primary frequency and at least one secondary frequency using a TDMA epoch that is divided into at least a beacon interval using the primary frequency and a digital data interval using the primary frequency and the at least one secondary frequency,
wherein said each wireless node is configured to overlap frequency usage on the at least one secondary frequency between said first TDMA mesh network and said second TDMA mesh network; and
allocating in both time and TDMA epoch a slot of channel time prior to a wireless node of the plurality of wireless nodes transmitting the data packets,
wherein said plurality of wireless nodes of said first TDMA mesh network and said second TDMA mesh network allocate an unused portion of the at least one secondary frequency to the second TDMA mesh network such that the digital data interval for the second TDMA mesh network does not fall into a used portion of the at least one secondary frequency allocated to the first TDMA mesh network; and
making an allocation request while previous requests are active; and
ordering channel allocations for a full duplex communication.

* * * * *